UNITED STATES PATENT OFFICE.

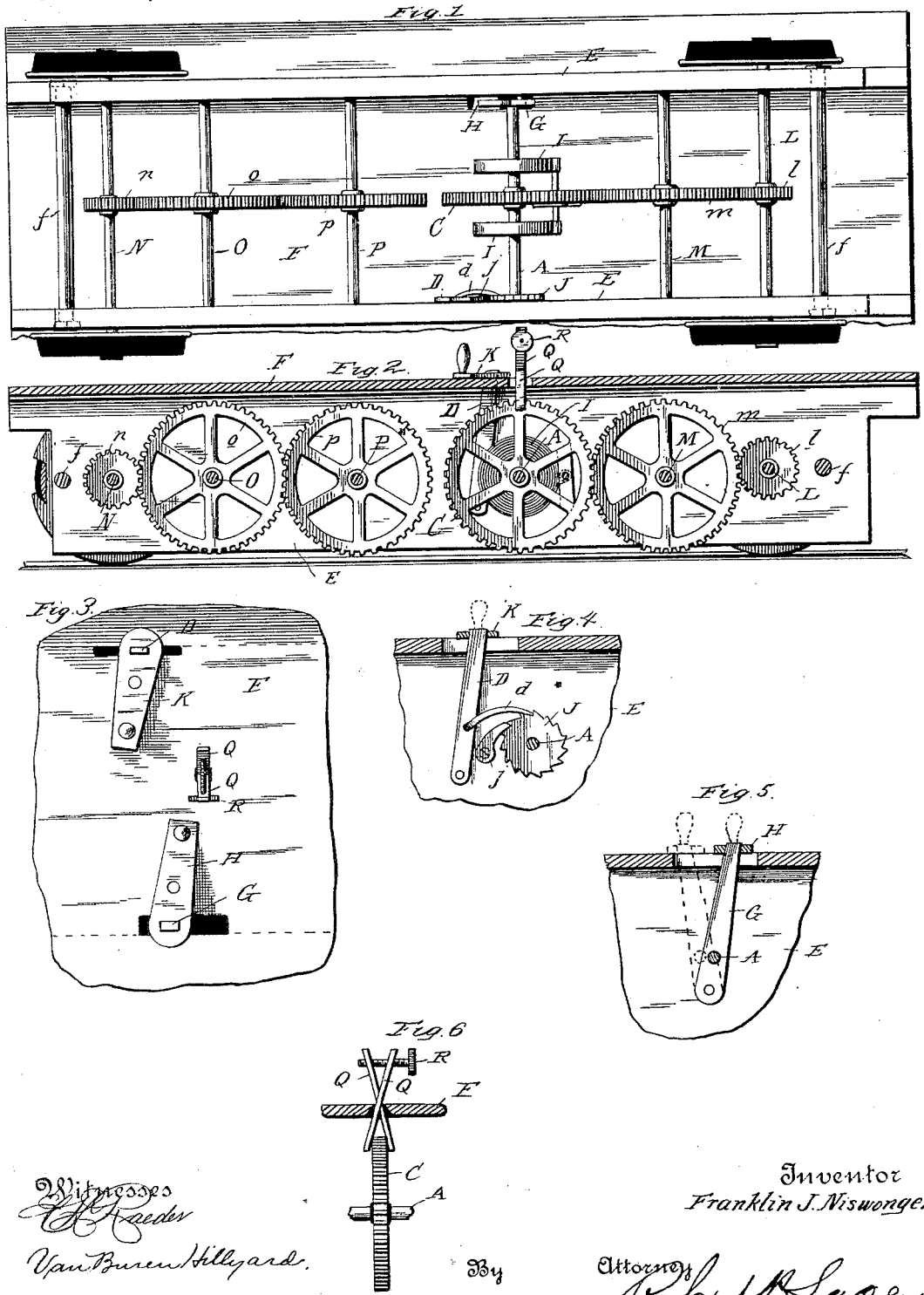

FRANKLIN J. NISWONGER, OF NEOGA, ILLINOIS.

SPRING-MOTOR FOR VEHICLES.

SPECIFICATION forming part of Letters Patent No. 419,060, dated January 7, 1890.

Application filed March 9, 1889. Serial No. 302,678. (No model.)

*To all whom it may concern:*

Be it known that I, FRANKLIN J. NISWONGER, a citizen of the United States, residing at Neoga, in the county of Cumberland and State of Illinois, have invented certain new and useful Improvements in Street-Cars; and I do declare the following to be a full, clear, and exact description of the invention, such as will enable others skilled in the art to which it appertains to make and use the same, reference being had to the accompanying drawings, and to the letters and figures of reference marked thereon, which form a part of this specification.

This invention relates to street-cars, hand-cars, or other vehicles, crafts, &c., and has for its object to provide a spring propelling mechanism for the same that can be operated quickly to impel the car in either direction and which will be simple, compact, and convenient to handle.

The improvement consists of the peculiar construction and combination of the parts, which will be hereinafter more fully described and claimed, and which are shown in the accompanying drawings, in which—

Figure 1 is a bottom plan view of a car embodying my invention; Fig. 2, a longitudinal section on the line X X of Fig. 1; Fig. 3, a detail view showing the levers for operating the winding and shifting levers; Fig. 4, a detail view showing the winding-lever on an enlarged scale; Fig. 5, a detail view showing the shifting-lever on a larger scale. Fig. 6 is a detail view showing the application of the brake.

The sides E of the frame which is applied to the platform F of the vehicle or car are braced at their ends by the bolts $f$. The shaft A is journaled at one end in one of the sides E and at its other end in the lever G, which is pivoted at its lower end to the side E and has its upper end projected vertically through an opening in the platform and engaging with the lever H, which is pivoted between its ends to the platform F. The master-wheel C, mounted on the shaft A, has lateral extensions which engage with the outer ends of the springs I, located upon either side of the wheel C, and having their inner ends fastened to the said shaft. The ratchet-wheel J on one end of the shaft A is engaged by the click $j$, and is operated to wind up the springs I by the pawl $d$ and the lever D, which latter projects through an opening in the platform and is engaged by one end of the lever K, which is pivoted between its ends to the said platform. The pinion $l$ on the axle L is in gear with the gear-wheel $m$ on the shaft M. The pinion $n$ on the axle N is in gear with the gear-wheel $o$ on the shaft O, and the gear-wheel $p$ on the shaft P meshes with the gear-wheel $o$. The springs are wound up by operating the lever D, as will be readily understood. When the master-wheel C is thrown in gear with the wheel $m$, the car or vehicle will be propelled in one direction, and when thrown in gear with the gear-wheel $p$ the vehicle will be driven in an opposite direction. The change in the position of the gear-wheel C is effected by operating the lever G, as will be readily comprehended.

The brake for controlling the driving mechanism is composed of the two levers Q Q, which are pivoted together between their ends, and which are arranged to embrace the sides of the master-wheel C between their lower ends, their upper ends being drawn together by the hand-screw R.

Each of the driving-wheels is provided with a rubber tire to prevent slipping.

Having thus described my invention, what I claim, and desire to secure by Letters Patent, is—

1. The hereinbefore-described car and vehicle propelling mechanism, composed of the sides E E, the axles N and L, having pinions $n$ and $l$, respectively, the shafts O and M, having gear-wheels $o$ and $m$, which are in gear with the pinions $n$ and $l$, respectively, the shaft P, having the gear-wheel $p$, which is in mesh with the gear-wheel $o$, the shaft A, having the master-wheel C adjustable between the gear-wheels $p$ and $m$ to bring the said wheel C in gear with either the wheel $p$ or $m$, the spring motive device, and the brake for controlling the movement of the mechanism, substantially as described.

2. In a car-propelling mechanism, the combination, with the axles N and L, each having drive-wheels, of the adjustable spring-actuated shaft having a master-wheel and gearing for connecting the master-wheel with the said axles, substantially as described.

3. The combination, with the axles N and L, having drive-wheels, of the shaft A, having a master-wheel journaled in a fixed bearing at one end, the lever G, forming a movable bearing for the other end of the said shaft A, and the gearing for connecting the master-wheel with the said axles, substantially as described.

4. In a car-propelling mechanism, the combination, with the wheel, as C, of the brake composed of the two levers Q Q, pivotally connected together and embracing the sides of the wheel C, and the hand-screw for clamping the said levers on the said wheel, substantially as described.

In testimony whereof I affix my signature in presence of two witnesses.

FRANKLIN J. NISWONGER.

Witnesses:
J. B. McCORMICK,
J. O. WALLACE.